US009122386B2

(12) United States Patent
Park et al.

(10) Patent No.: US 9,122,386 B2
(45) Date of Patent: *Sep. 1, 2015

(54) ADAPTIVE VIDEO PROCESSING APPARATUS AND METHOD OF SCALING VIDEO BASED ON SCREEN SIZE OF DISPLAY DEVICE

(71) Applicant: SAMSUNG ELECTRONICS CO., LTD., Suwon-si (KR)

(72) Inventors: Yong-jun Park, Seoul (KR); Hee-soo Lee, Suwon-si (KR); Byung-soo Kim, Seoul (KR); Jae-cheol Lee, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/448,582

(22) Filed: Jul. 31, 2014

(65) Prior Publication Data
US 2014/0362116 A1 Dec. 11, 2014

Related U.S. Application Data

(63) Continuation of application No. 13/858,544, filed on Apr. 8, 2013, now Pat. No. 8,810,605, which is a continuation of application No. 12/043,423, filed on Mar. 6, 2008, now Pat. No. 8,416,267.

(30) Foreign Application Priority Data

Aug. 27, 2007  (KR) .................. 10-2007-0085856

(51) Int. Cl.
*G06T 3/40* (2006.01)
*G09G 5/00* (2006.01)

(52) U.S. Cl.
CPC .............. *G06F 3/04845* (2013.01); *G06T 3/40* (2013.01); *G06T 3/4092* (2013.01)

(58) Field of Classification Search
CPC ...... G06F 3/04845; G06T 3/40; G06T 3/4092
See application file for complete search history.

(56) References Cited

U.S. PATENT DOCUMENTS

| 7,075,460 B2 | 7/2006 | Apostolopoulos et al. |
| 2003/0099460 A1 | 5/2003 | Imada et al. |

(Continued)

FOREIGN PATENT DOCUMENTS

| KR | 1020040077263 A | 9/2004 |
| KR | 10-2006-0005578 A | 1/2006 |

(Continued)

OTHER PUBLICATIONS

Kymin, Jennifer. "CSS 3 Style Property: background-size." May 2007. About, Inc.*

(Continued)

*Primary Examiner* — Jeffery A Brier
(74) *Attorney, Agent, or Firm* — Sughrue Mion, PLLC

(57) ABSTRACT

Provided are an apparatus for processing adaptive video and a method of scaling video, which generate a graphical user interface (GUI) so that a GUI suitable for the screen size of a display device can be displayed according to the screen size of the display device. The apparatus can realize a GUI most suitable for the screen size of an external display device connected to the apparatus by enlarging or reducing the size of the GUI according to the screen size of the external display device, or by changing the arrangement of items arranged on the GUI.

10 Claims, 6 Drawing Sheets

(51) Int. Cl.
  *G06K 9/32* (2006.01)
  *G06F 3/0484* (2013.01)

(56) References Cited

U.S. PATENT DOCUMENTS

| | | |
|---|---|---|
| 2004/0015551 A1 | 1/2004 | Thornton |
| 2004/0105127 A1 | 6/2004 | Cudd et al. |
| 2005/0184968 A1 | 8/2005 | Uchida et al. |
| 2006/0012616 A1 | 1/2006 | Paek |
| 2006/0080386 A1 | 4/2006 | Roykkee et al. |
| 2006/0284786 A1 | 12/2006 | Takano et al. |
| 2007/0019886 A1 | 1/2007 | Han |
| 2007/0033522 A1* | 2/2007 | Lin et al. .................. 715/526 |
| 2007/0053513 A1 | 3/2007 | Hoffberg |
| 2007/0127523 A1 | 6/2007 | Marrow |
| 2007/0182853 A1 | 8/2007 | Nishikawa |
| 2008/0168073 A1 | 7/2008 | Siegel et al. |

FOREIGN PATENT DOCUMENTS

| | | |
|---|---|---|
| KR | 1020060077443 A | 7/2006 |
| KR | 10-2007-0010910 A | 1/2007 |

OTHER PUBLICATIONS

Chinese Office Action, dated Apr. 14, 2011, issued in Application No. 200880104844.3.

Chinese Office Action dated Mar. 12, 2012 issued in Chinese Application No. 200880104844.3.

Communication dated Oct. 16, 2013, issued by the State Intellectual Property Office of the People's Republic of China in corresponding Application No. 200880104844.3.

Communication dated Jun. 23, 2014 issued by the Korean Intellectual Property Office in counterpart Korean Patent Application No. 10-2007-0085856.

\* cited by examiner

GUI GENERATOR (300)
- 310 GUI GENERATION INFORMATION STORAGE UNIT
- 320 GUI CHANGER

| GUI GENERATION INFORMATION ||||
|---|---|---|---|
| SCREEN SIZE | SCALING RATIO | ITEM ARRANGEMENT | NUMBER OF COLUMNS |
| ~32" | 1 : 0.8 | 5 * 3 | 8 |
| ~40" | 1 : 0.6 | 5 * 4 | 9 |
| ~50" | 1 : 0.5 | 6 * 4 | 11 |
| ~60" | 1 : 0.4 | 6 * 5 | 13 |
| . . . | . . . | . . . | . . . |

ADAPTIVE VIDEO PROCESSING APPARATUS AND METHOD OF SCALING VIDEO BASED ON SCREEN SIZE OF DISPLAY DEVICE

CROSS-REFERENCE TO RELATED PATENT APPLICATION

This is a Continuation of Application of U.S. application Ser. No. 13/858,544 filed on Apr. 8, 2013, which is a continuation of U.S. application Ser. No. 12/043,423 filed on Mar. 6, 2008, which claims priority from Korean Patent Application No. 10-2007-0085856, filed on Aug. 27, 2007, in the Korean Intellectual Property Office, the disclosure of which is incorporated herein in its entirety by reference.

BACKGROUND OF THE INVENTION

1. Field of the Invention

The present invention relates to a video signal scaler and an apparatus for processing video, and more particularly, to an adaptive video processing apparatus and a method of scaling video, which can provide a graphical user interface (GUI) suitable for a screen size of a display device that is to display the GUI by changing the size and configuration of the GUI according to the screen size of the display device.

2. Description of the Related Art

Conventional multimedia devices, which were once limited to video players and DVD players, have recently diversified, as digital technologies have developed, into MP3 players, personal digital assistants (PDAs), and portable multimedia players (PMPs).

A recent multimedia device, such as a PMP, supports a TV-out function, which transmits and outputs a video signal to an external display device, such as a TV. Such a TV-out function displays a video signal by suitably scaling the video signal to a screen size of the external display device.

FIG. 1 is a diagram for describing a conventional TV-out function. Referring to FIG. 1, a reference numeral 110 denotes a PMP as an example of a multimedia device, and a reference numeral 120 denotes an example of a GUI displayed on a screen of the PMP 110. Also, a reference numeral 130 denotes an external display device connected to the PMP 110, and a reference numeral 140 denotes a GUI enlarged and displayed on a screen of the external display device 130 using a TV-out function.

Referring to FIG. 1, a video signal that is to be displayed on the screen of the external display device 130 is scaled according to the ratio of the screen of the PMP 110 to the screen of the external display device 130. Here, when a horizontal length of the screen of the PMP 110 is X and a vertical length of the screen of the PMP 110 is Y, and a horizontal length of the screen of the external display device 130 is X' and a vertical length of the screen of the external display device 130 is Y', the video signal is displayed on the screen of the external display device 130 after a horizontal component of the video signal is enlarged by the ratio of X:X', and a vertical component of the video signal is enlarged by the ratio of Y:Y'. According to such a conventional technology, the GUI 130 for a user input of the PMP 110 is also displayed on the screen of the external display device 130 after enlarging a horizontal component by the ratio of X:X' and a vertical component by the ratio of Y:Y'. As described above, a GUI screen of an apparatus for processing video, such as a PMP, is always enlarged or reduced by the same ratio of a video signal before being displayed on an external display device.

However, when a GUI, which is formed to be suitable for a small screen of a PMP, is displayed on an external display device, which has a large screen, by scaling the GUI by the same ratio of a video signal, or alternatively, when the GUI is displayed on an external display device, which has a smaller screen than the PMP, by scaling the GUI by the same ratio of a video signal, the GUI may be overly enlarged or reduced.

Also, a GUI displayed through an external display device has a fixed form and it is not possible to change the configuration of the GUI according to a screen size of the external display device.

SUMMARY OF THE INVENTION

Exemplary embodiments of the present invention provide an apparatus for processing video and a method of scaling the video, which can adaptively change the size or configuration of a graphical user interface (GUI) of the apparatus according to a screen size of an external display device connected to the apparatus.

According to an aspect of the present invention, there is provided an apparatus for processing video, which provides video data by being connected to a predetermined display device, the apparatus including: a display device information reader, which reads display device information that includes information about a screen size of the display device; a graphical user interface (GUI) data storage unit, which stores data about a GUI displayed on the display device; a GUI controller, which generates a control signal for changing at least one of a size and configuration of the GUI according to the screen size of the display device; a GUI generator, which generates a GUI by changing the at least one of size and configuration of the GUI according to the control signal; and a video processor, which combines and processes the generated GUI and an input video signal.

According to another aspect of the present invention, there is provided a method of scaling video displayed on a predetermined display device, the method including: reading display device information, which includes information about a screen size of the display device; generating a GUI by changing at least one of a size and configuration of a GUI displayed on the display device according to the screen size of the display device; and displaying the generated GUI on the display device after combining the generated GUI with an input video signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown.

Figure 1:
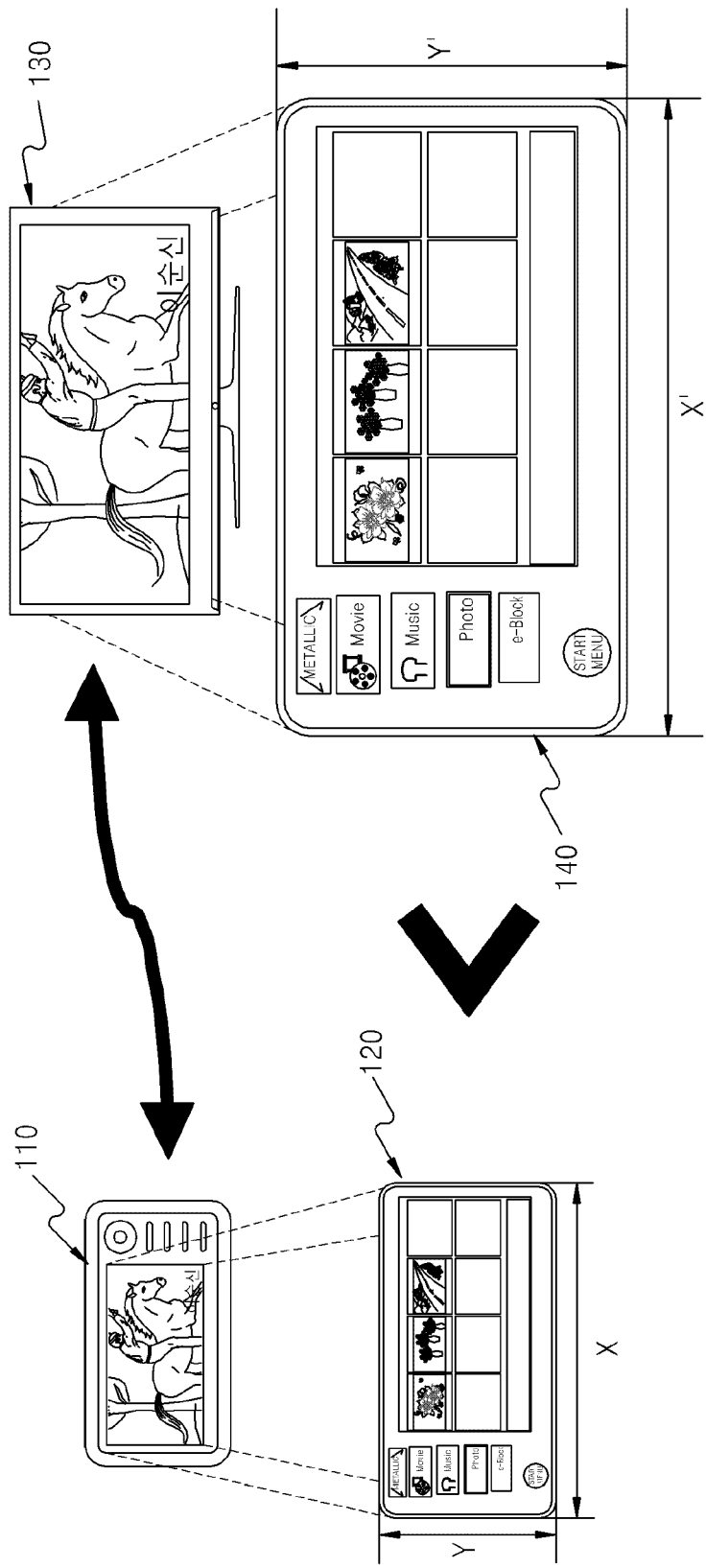
FIG. 1 is a diagram for describing a related art TV-out function.
Figure 2:
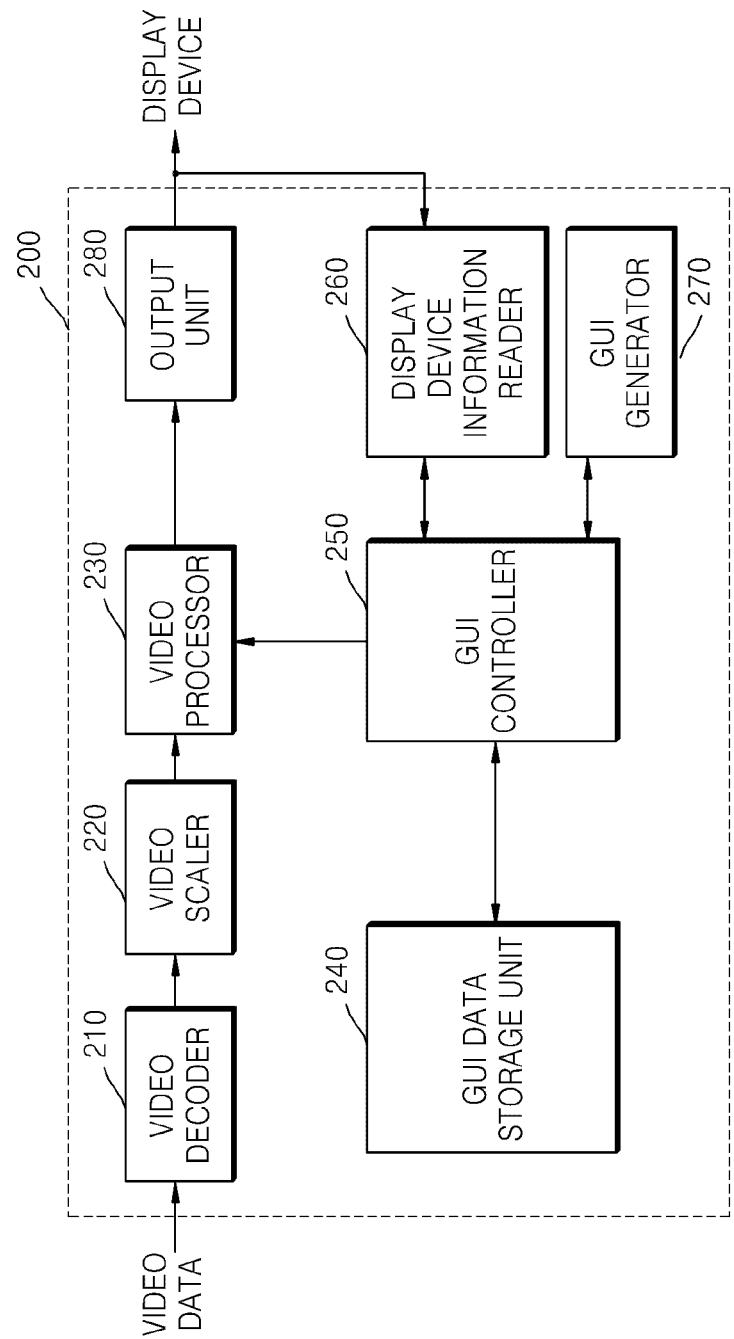
FIG. 2 is a block diagram illustrating an apparatus for processing video according to an exemplary embodiment of the present invention.

FIG. 2 is a block diagram illustrating an apparatus 200 for processing video according to an embodiment of the present invention.

An apparatus for processing multimedia, such as an MP3 player, a personal digital assistant (PDA), or a portable multimedia player (PMP), may be used as the apparatus 200. However, the apparatus 200 is not limited to the above, but various other apparatuses which provide video data to an external display device can be used. Also, various devices, such as a conventional TV, a Liquid crystal display television (LCD TV), an LCD computer monitor, a plasma display panel (PDP) TV, or a projection TV, may be used as an external display device connected to the apparatus 200. While describing the present invention, it is assumed that the apparatus 200 and the external display device are connected via various wired/wireless interfaces. For example, the apparatus 200 and the external display device may be connected via a wireless interface, such as Bluetooth, Ultra-wideband (UWB), ZigBee, wireless local area network (WLAN), binary, Code division multiple access (CDMA), Infrared Data Association (IrDA), wireless, or Universal Serial Bus (USB) communications, or via a wired interface, such as IEEE 1394, High-Definition Multimedia Interface (HDMI), serial, component, or composite communications.

Referring to FIG. 2, the apparatus 200 includes a video decoder 210, a video scaler 220, a video processor 230, a graphical user interface (GUI) data storage unit 240, a GUI controller 250, a display device information reader 260, and a GUI generator 270.

The video decoder 210 restores a video signal by decoding video data, which is input from an external video source, according to a compression type of the video data. Here, the image data may include all of broadcast signals, which are transmitted via a broadcasting station or the like, and video signals, which are read from a predetermined storage device.

The video scaler 220 outputs the input video data by scaling the video data so as to be suitable for a screen size of the connected external display device. Here, the input video data may be scaled using a conventional method, and thus details thereof are omitted herein.

The display device information reader 260 reads display device information about the connected external display device. The display device information includes information about the screen size of the display device, and may additionally include information about a model name of the display device, a scaling ratio of a GUI according to the screen size, arrangement of on screen display (OSD) menu items displayed on the GUI, the number of text lines displayed on the screen, and the number of columns displayed on the screen.

The GUI data storage unit 240 stores data about GUIs displayed on the screen of the apparatus 200 and the screen of the external display device. For example, picture files of items displayed on the GUI may be stored in the GUI data storage unit 240.

The GUI controller 250 generates a control signal for changing the size and/or configuration of the GUI by using the information about the screen size of the display device read from the display device information reader 260, and outputs the control signal to the GUI generator 270.

The GUI generator 270 generates the final GUI by changing the size and/or configuration of the GUI according to the control signal.

Figures 3, 4:
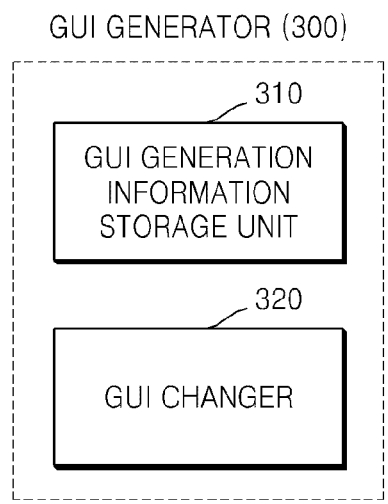
FIG. 3 is a diagram illustrating a graphical user interface (GUI) generator illustrated in FIG. 2 according to an exemplary embodiment of the present invention.
FIG. 4 is a table of GUI generation information according to an exemplary embodiment of the present invention.

FIG. 3 is a diagram illustrating the GUI generator 270 illustrated in FIG. 2 according to an embodiment of the present invention and FIG. 4 is a table of GUI generation information according to an embodiment of the present invention.

Referring to FIG. 3, a GUI generator 300 includes a GUI generation information storage unit 310 and a GUI changer 320.

Referring to FIG. 4, the GUI generation information storage unit 310 stores information about a scaling ratio of a GUI according to a screen size of an external display device, the arrangement of items displayed on the GUI, information on the number of lines that should be displayed on one screen, and information on the number of columns displayed on one screen is stored in a form of a table, in order to generate a GUI having the size and configuration suitable for the screen size of the external display device connected to the apparatus 200. Here, the scaling ratio of the GUI is an enlargement ratio or a reduction ratio of a horizontal and/or vertical component of the GUI based on the size of the GUI displayed on the apparatus 200 according to the screen size of the external display device. For example, "1:0.8" denotes that when the size of the GUI, which is scaled by the same ratio as that of the video data and displayed on the external display device, is 1, the scaling ratio of the video data displayed on the external display device is not applied, but instead, 0.8 times the scaling ratio of the video data is applied. In other words, when the screen size of the apparatus 200 is 320×240 and when the screen size of the external display device is 640×480, the video data is displayed after being doubled respectively in vertical and horizontal directions. However, the GUI is not doubled respectively in vertical and horizontal directions but enlarged 2*0.8=1.6 times. Meanwhile, FIG. 4 illustrates that one scaling ratio is applied to both horizontal and vertical components, but a scaling ratio may be different in each of the horizontal and vertical components according to the screen size of the external display device.

The GUI changer 310 generates the final GUI by rearranging the GUI by using the information about the screen size of the external display device, which is input through the GUI controller 250, information about the scaling ratio according to the screen size of the external display device, which is stored in the GUI generation information storage unit 310, and configuration information of the GUI.

Figure 5:
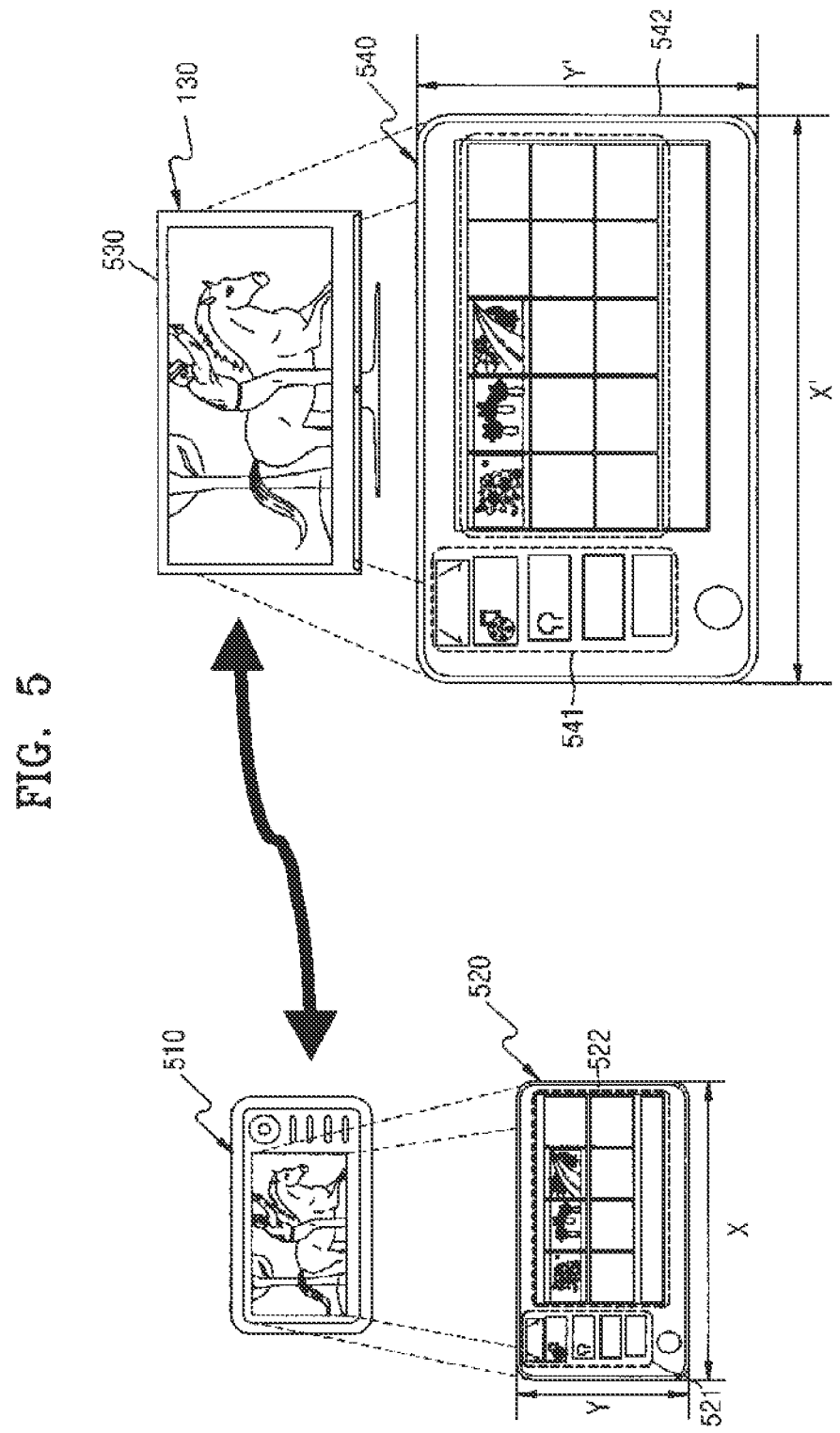
FIG. 5 is a diagram illustrating a GUI displayed on a screen of an external display device based on the screen size of the external display device according to an exemplary embodiment of the present invention.

FIG. 5 is a diagram illustrating a GUI displayed on a screen of an external display device based on the screen size of the external display device according to an embodiment of the present invention.

In FIG. 5, a reference numeral 510 denotes an apparatus for processing video according to the present invention and a reference numeral 520 denotes a GUI displayed on the screen of the apparatus 510. A reference numeral 530 denotes an external display device connected to the apparatus 510 and a reference numeral 540 denotes a GUI enlarged and displayed on a screen of the external display device 530.

Referring to FIGS. 3 through 5, video data provided from the apparatus 510 and displayed on the external display device 530 is enlarged according to the screen size of the external display device 530 similarly to conventional video data. In other words, when a horizontal length of the screen of the apparatus 510 is X and a vertical length of the screen of the apparatus 510 is Y, and a horizontal length of the screen of the external display device 530 is X' and a vertical length of the screen of the external display device 530 is Y', the video data is displayed on the screen of the external display device 530 after a horizontal component of the video data is enlarged by a ratio of X:X' and a vertical component of the video data is enlarged by a ratio of Y:Y'.

According to the present invention, when the GUI is processed, the size of the GUI is not scaled by the same scaling ratio as that of the video data but is scaled by a ratio different from the scaling ratio of the video data by using scaling ratio information of the GUI, according to the screen size of the external display device 530, stored in the GUI generation information storage unit 310, and then the GUI is displayed on the screen of the external display device 530. Also, the configuration of the GUI is changed according to the screen size of the external display device 530 by changing the arrangement of thumb-nails displayed on the GUI by using arrangement information of items of the GUI stored in the GUI generation information storage unit 310.

For example, when the screen size of the external display device 530 is 32", the GUI changer 320 reads a scaling ratio of 1:0.8 of the GUI according to the screen size of the external display device 530 of 32" stored in the GUI generation information storage unit 310, and arrangement information of 5*3 of items displayed on the GUI. Then, the GUI changer 320 changes the size of the GUI by using the scaling ratio of 1:0.8 of the GUI. For example, when the screen size of the external display device 530 is twice as large vertically and horizontally as the screen size of the apparatus 510, the video data is doubled both vertically and horizontally and then displayed, but the GUI is enlarged to 2*0.8=1.6 times and then displayed. Also, the GUI changer 320 rearranges items 522, displayed in a 2*4 thumbnail format on the GUI 520 of the apparatus 510, to a 3*4 thumbnail format 542 by using the arrangement information of 3*5 of the GUI according to the screen size of 32" of the external display device 320.

Figure 6:
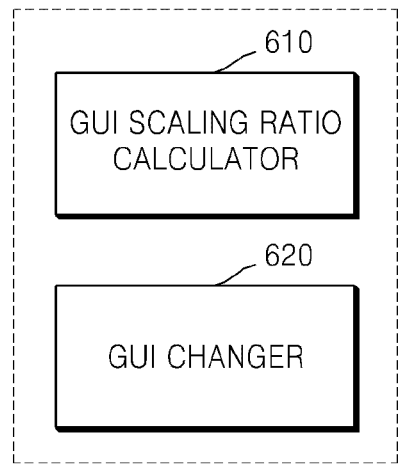
FIG. 6 is a diagram illustrating a GUI generator illustrated in FIG. 2 according to another exemplary embodiment of the present invention.

FIG. 6 is a diagram illustrating the GUI generator 270 illustrated in FIG. 2 according to another embodiment of the present invention.

Referring to FIG. 6, a GUI generator 600 includes a GUI scaling ratio calculator 610 and a GUI changer 620.

In the GUI generator 300 described above, the GUI is rearranged using the scaling ratio of the GUI or the arrangement information of the items of the GUI, according to the screen size of the external display device, contained in the pre-stored GUI generation information. However, according to the GUI generator 600 according to the current embodiment, the GUI scaling ratio calculator 610 does not separately include the GUI generation information, but calculates a scaling ratio and the arrangement of the GUI so as to be suitable for the external display device by using the information about the screen size of the external display device input from the GUI controller 250.

The GUI changer 620 generates the final GUI by rearranging the GUI by using the scaling ratio and arrangement information of the GUI determined in the same manner as the GUI changer 320.

Referring back to FIG. 2, when the display device information read from the display device information reader 260 not only contains the information about the screen size of the external display device but also contains the scaling ratio information or arrangement information of the items of the GUI, the GUI generator 270 may skip separately calculating the GUI generation information but rearrange the GUI by using the scaling ratio or arrangement information of the GUI read from the display device information.

The GUI controller 250 outputs the GUI rearranged according to the screen size of the external display device to the video processor 230.

The video processor 230 outputs the rearranged GUI after combining the rearranged GUI with decoded input video data.

The output unit 280 is in charge of wired/wireless communication with the external display device, and converts the data output from the video processor 230 to a format that is suitable for an interface with the external display device, and outputs the converted data to the external display device.

Meanwhile, according to the present invention, the GUI controller 250 outputs the control signal to the GUI generator 270 so that the GUI is generated so as to be suitable for the resolution of the external display device, by using resolution information of the external display device connected to the apparatus 200. Also, the GUI generator 270 can change the resolution of the GUI by up-scaling or down-scaling the data about a GUI, which is stored in the GUI data storage unit 240, so as to be suitable for the resolution of the external display device. In this case, the quality of the GUI, in which the resolution is changed through the up-scaling or down-scaling, may deteriorate, and thus the data about a GUI suitable for the resolution of the external display device may be received from a predetermined external server, stored in the GUI data storage unit 240, and then used.

Figure 7:
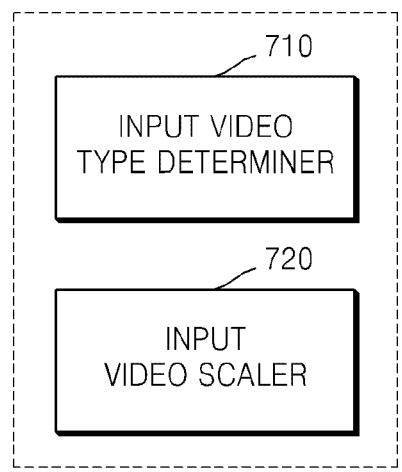
FIG. 7 is a diagram illustrating a video scaler according to an exemplary embodiment of the present invention.

FIG. 7 is a diagram illustrating the video scaler 220 illustrated in FIG. 2 according to an embodiment of the present invention.

Referring to FIG. 7, a video scaler 700 according to the current embodiment of the present invention includes an input video type determiner 710 and an input video scaler 720.

The input video type determiner 710 determines a scaling portion that is to be enlarged or reduced in video data according to the type of decoded video data or selection of a user. The type of the video data may be included in header information of the decoded video data, and when the video data is a broadcasting signal, the type of the video data may be determined using broadcasting information in an electronic program guide (EPG). For example, when the type of the video data is for reproducing a sports match, a part with a lot of activity may be determined as a scaling portion. Also, a scaling portion can be selected by the user or can be selected from among pre-set scaling portions. Alternatively, a predetermined video data portion can be determined as a scaling portion by the user.

The input video scaler 720 enlarges or reduces the video data of the determined scaling portion so as to be suitable for the screen size of the external display device.

Figure 8:
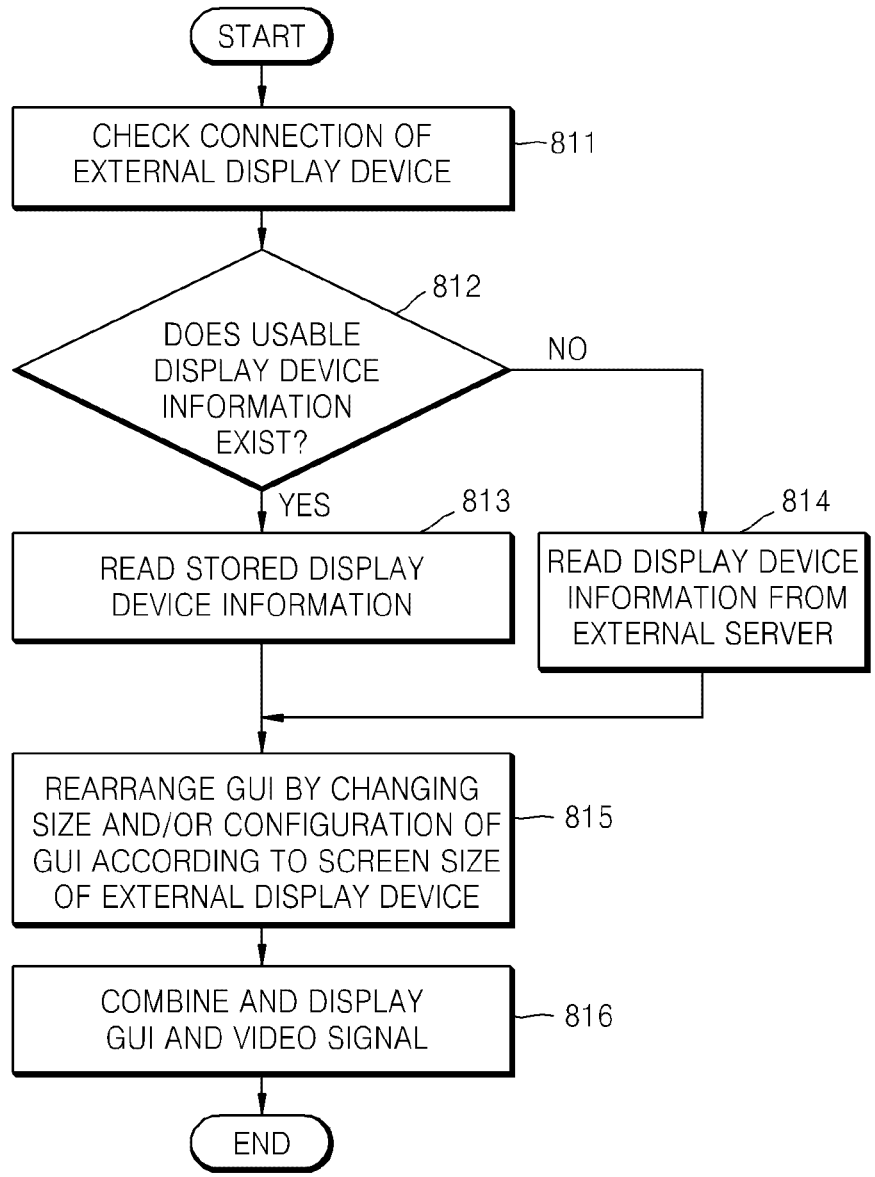
FIG. 8 is a flowchart illustrating a method of scaling video according to an exemplary embodiment of the present invention.

FIG. 8 is a flowchart illustrating a method of scaling video according to an embodiment of the present invention.

Referring to FIG. 8, a connection status between a predetermined apparatus for processing video, which provides video data, and an external display device, which receives the video data from the apparatus and displays the video data, is checked in operation 811.

In operation 812, it is determined whether usable display device information about the connected external display device exists. As described above, in order to generate a GUI according to the screen size of the external display device, the display device information should contain information about the screen size of the external display device. Besides, the display device information may further include information about a model name of the display device, a scaling ratio of the GUI according to the screen size, arrangement of OSD menu items displayed on the GUI, the number of text lines displayed on the screen, and the number of columns displayed on the screen.

When it is determined that the usable display device information exists in operation 812, the display device information is read in operation 813. When it is determined that the usable display device information does not exist in operation 812, the display device information is read from an external server in operation 814.

In operation 815, the GUI is rearranged by changing the size and/or configuration of the GUI displayed on the external display device according to the screen size of the external display device. As described above, when only the information about the screen size of the external display device is stored, the GUI can be rearranged by using the GUI generation information table, pre-stored with information about a scaling ratio and the arrangement of items of the GUI, according to the screen size of the external display device. Also, when only the information about the screen size of the external display device exists, the scaling ratio and the arrangement of items of the GUI suitable for the screen size can be calculated in order to rearrange the GUI. When the display device information read in operation 813 or 814 contains the scaling ratio and arrangement information of the GUI, the final GUI is generated by rearranging the GUI by using the scaling ratio and arrangement information. When a user has set up a scaling ratio or arrangement of the items of the GUI according to the screen size of the connected external display device, the GUI may be rearranged by using such information selected by the user.

In operation 816, the generated GUI and a video signal are combined and then output to the external display device. Accordingly, the external display device displays the combination of the generated GUI and the video signal on the screen.

The invention can also be embodied as computer readable codes on a computer readable recording medium or other types of computer readable media. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. An example of other types of computer readable media is carrier waves (such as data transmission through the Internet). The computer readable recording medium can also be distributed over network coupled computer systems so that the computer readable code is stored and executed in a distributed fashion.

According to aspects of the present invention, convenience for a user can be increased by providing a suitable GUI according to a connected external display device.

Also, the user can automatically obtain information about the external display device even if the user does not separately have the information about the external display device, and thus an optimum TV-out function can be realized.

In addition, the amount of information provided to the user can be suitably adjusted by adaptively changing the size and configuration of the GUI according to the external display device, and thus manipulation convenience for the user can be improved.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for processing an image, the apparatus comprising:
    a display having a screen and configured to display a first image and a second image on the screen of the display;
    a processor configured to determine a first scaling ratio of the first image based on a size of a screen of a target device external to the apparatus;
    a video scaler configured to scale the first image according to the determined first scaling ratio of the first image; and
    a transmitter configured to transmit the scaled first image to the target device,
    wherein the first image is displayed in the second image, and
    wherein the first scaling ratio of the first image is different from a second scaling ratio of the second image.

2. The apparatus of claim 1, wherein the first image has a first horizontal dimension and a first vertical dimension, the second image has a second horizontal dimension and a second vertical dimension, the screen of the target device has a third horizontal dimension and a third vertical dimension, and a ratio of the first horizontal dimension of the first image to the third horizontal dimension of the screen of the target device is different from a ratio of the second horizontal dimension of the second image to the third horizontal dimension of the screen of the target device or a ratio of the first vertical dimension of the first image to the third vertical dimension of the screen of the target device is different from a ratio of the second vertical dimension of the second image to the third vertical dimension of the screen of the target device.

3. The apparatus of claim 1, wherein the first scaling ratio is an enlargement ratio or a reduction ratio of at least one of horizontal and vertical image dimensions of the first image.

4. The apparatus of claim 1, wherein the first image is a graphic user interface (GUI).

5. The apparatus of claim 1, wherein the processor is configured to read information about dimensions of the screen of the target device from an external server or the target device through a network.

6. A method of scaling image data, the method comprising:
    displaying a first image and a second image on a screen of a display of an apparatus;
    determining a first scaling ratio of the first image based on a size of a screen of a target device external to the apparatus;
    scaling the first image according to the determined first scaling ratio of the first image; and
    transmitting the scaled first image to the target device,
    wherein the first image is displayed in the second image; and
    wherein the first scaling ratio of the first image is different from a second scaling ratio of the second image.

7. The method of claim 6, wherein the first image has a first horizontal dimension and a first vertical dimension, the second image has a second horizontal dimension and second vertical dimension, the screen of the target device has a third horizontal dimension and a third vertical dimension, and a ratio of the first horizontal dimension of the first image to the third horizontal dimension of the screen of the target device is different from a ratio of the second horizontal dimension of the second image to the third horizontal dimension of the screen of the target device or a ratio of the first vertical dimension of the first image to the third vertical dimension of the screen of the target device is different from a ratio of the second vertical dimension of the second image to the third vertical dimension of the screen of the target device.

8. The method of claim 6, wherein the first scaling ratio is an enlargement ratio or a reduction ratio of at least one of horizontal and vertical image dimensions of the first image.

9. The method of claim 6, wherein the first image is a graphic user interface (GUI).

10. The method of claim 6, further comprising reading information about dimensions of the screen of the target device from an external server or the target device through a network.

* * * * *